United States Patent [19]
Adam

[11] Patent Number: 5,028,709
[45] Date of Patent: Jul. 2, 1991

[54] ANTHRAQUINONE VAT DYES

[75] Inventor: Jean-Marie Adam, Rosenau, France

[73] Assignee: Ciba-Geigy Corporation, Ardsley, N.Y.

[21] Appl. No.: 5,991

[22] Filed: Jan. 21, 1987

[30] Foreign Application Priority Data

Jan. 29, 1986 [CH] Switzerland ............................ 328/86

[51] Int. Cl.$^5$ .................. C07D 215/36; C07D 257/00
[52] U.S. Cl. ..................... 546/172; 546/174; 546/176; 546/276; 548/235; 548/252; 548/253; 548/254
[58] Field of Search ............... 548/253, 110, 252, 254, 548/215, 235; 260/367; 546/172, 174, 176, 276

[56] References Cited

U.S. PATENT DOCUMENTS

| | | | |
|---|---|---|---|
| 2,076,197 | 4/1937 | Gutzwiller | 260/367 |
| 2,628,230 | 2/1953 | Stilmar | 260/367 |
| 3,984,429 | 10/1976 | Peel et al. | 548/253 |
| 4,422,972 | 12/1983 | Daly et al. | 260/367 |
| 4,598,155 | 7/1986 | Adam | 548/253 |

FOREIGN PATENT DOCUMENTS 79862  5/1983  European Pat. Off. ............ 548/253

OTHER PUBLICATIONS

Abrahart, *Dyes and Their Intermediates*, 1968, pp. 183-185.

Primary Examiner—C. Warren Ivy
Assistant Examiner—Raymond Covington
Attorney, Agent, or Firm—Wenderoth, Lind & Ponack

[57] ABSTRACT

The invention relates to vat dyes of the formula

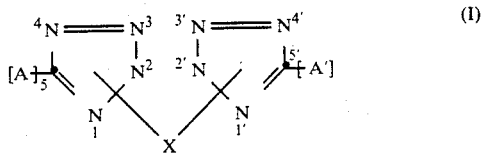

wherein [A] and [A'] and X are as defined in claim 1.

The vat dyes of formula I are suitable for dyeing or printing a wide range of materials. Dyeings with good fastness properties are obtained in particular on cellulose material.

15 Claims, No Drawings

ANTHRAQUINONE VAT DYES

The present invention relates to novel anthraquinone vat dyes, to the preparation thereof and to the use thereof for dyeing or printing textile materials, in particular those made of cellulosic fibre materials.

The invention relates to vat dyes of the formula

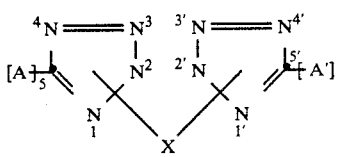  (I)

wherein

[A] and [A'] are each independently of the other an anthraquinone radical of the formula

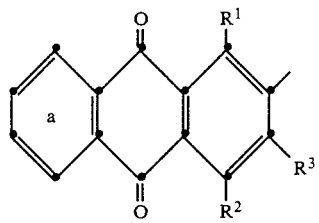  (II)

$R^1$ and $R^2$ are each independently of the other —NHR$^4$ or —OR$^5$, $R^3$ is hydrogen, —CN, halogen, —CONR$^5$R$^6$, —SO$_2$NR$^5$R$^6$ or —COOR$^7$, $R^4$ is hydrogen, unsubstituted or substituted $C_1$-$C_6$alkyl, unsubstituted or substituted $C_5$-$C_8$cycloalkyl, unsubstituted or substituted aryl, or —COR$^8$, $R^5$ and $R^6$ are each independently of the other hydrogen, unsubstituted or substituted $C_1$-$C_6$alkyl or unsubstituted or substituted phenyl, $R^7$ is unsubstituted or substituted $C_1$-$C_6$alkyl, or $C_5$-$C_8$-cycloalkyl, $R^8$ is unsubstituted or substituted $C_1$-$C_6$alkyl or unsubstituted or substituted phenyl, X is an organic bridge member and the radical (a) of the benzene series is unsubstituted or substituted.

If $R^1$ and/or $R^2$ are —NHR$^4$, then $R^4$ may be an unsubstituted or substituted $C_1$-$C_6$alkyl radical.

Throughout this specification, an unsubstituted or substituted $C_1$-$C_6$alkyl radical shall in general le understood as meaning a methyl, ethyl, n-propyl, isopropyl, n-butyl, sec-butyl or tert-butyl radical or a straight chain or branched pentyl or hexyl radical, each of which radicals may be substituted by one or more substituents selected from the group consisting e.g. of —OH, $C_1$-$C_4$alkoxy and $C_1$-$C_4$alkoxy substituted by —OH.

Examples of suitable substituted $C_1$-$C_6$alkyl radicals are: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl and 2-hydroxyethoxypentyl.

$R^4$ as an unsubstituted or substituted cycloalkyl radical is preferably a cyclopentyl or cyclohexyl radical; preferred substituents for the cycloalkyl radical are $C_1$-$C_3$alkyl groups, with methyl groups being most preferred.

$R^4$ as aryl is e.g. naphthyl or, preferably, phenyl, each of which may be unsubstituted or substituted by one or more identical or different substituents. Examples of possible substituents are: $C_1$-$C_4$alkyl, which throughout this specification shall in general be understood as meaning methyl, ethyl, n-propyl, isopropyl, n-butyl, sec-butyl or tert-butyl; $C_1$-$C_4$alkoxy, which throughout this specification shall in general be understood as meaning methoxy, ethoxy, n-propoxy, isopropoxy, n-butoxy, sec-butoxy or tert-butoxy; halogen such as fluorine, chlorine or bromine; nitro or the —NHCOR$^8$ group, in which R$^8$ is as defined above.

$R^4$ as substituted aryl is preferably phenyl which is substituted by 1 to 3 substituents selected from the group consisiting of $C_1$-$C_4$alkyl, chlorine and methoxy.

If $R^4$ is a —COR$^8$ group, then R$^8$ may be an unsubstituted or substituted $C_1$-$C_6$alkyl radical, or a phenyl radical which is unsubstituted or substituted by one or more substituents selected from the group consisting of $C_1$-$C_4$alkyl, $C_1$-$C_4$alkoxy, halogen and nitro. If R$^4$ is the —COR$^8$ group, then R$^8$ is preferably methyl or phenyl.

Preferably, R$^4$ is hydrogen, phenyl which is unsubstituted or substituted by 1 to 3 substituents selected from the group consisting of $C_1$-$C_4$alkyl, chlorine and methoxy, or $C_5$-$C_8$cycloalkyl.

If $R^1$ and/or $R^2$ are an —OR$^5$ radical, then R$^5$ may be hydrogen, unsubstituted or substituted $C_1$-$C_6$alkyl, or phenyl which is unsubstituted or substituted by one or more identical or different substituents. R$^5$ as substituted phenyl may carry e.g. 1 to 3 substituents selected from the group consisting of $C_1$-$C_4$alkyl, $C_1$-$C_4$alkoxy and halogen. R$^5$ as phenyl is preferably unsubstituted phenyl or phenyl which is substituted by 1 to 3 $C_1$-$C_4$alkyl radicals. Particularly preferred meanings of R$^5$ are hydrogen, $C_1$-$C_4$alkyl and phenyl.

The radicals $R^1$ and $R^2$ may be identical or different. Preferably, $R^1$ and $R^2$ are each independently of the other —NHR$^4$.

In a particularly preferred embodiment of the vat dyes of the present invention, $R^1$ and $R^2$ are each independently of the other —NHR$^4$, in which R$^4$ is hydrogen, $C_1$-$C_4$alkyl or $C_5$-$C_6$cycloalkyl, or is phenyl which is unsubstituted or substituted by one or more substituents selected from the group consisting of $C_1$-$C_4$alkyl, $C_1$-$C_4$alkoxy and halogen.

If R$^3$ is a —CONR$^5$R$^6$ or —SO$_2$NR$^5$R$^6$ group, then the meanings and preferences cited above for R$^5$ are valid for each of R$^5$ and R$^6$ independently of the other.

If R$^3$ is —COOR$^7$, then R$^7$ may be a straight chain or branched $C_1$-$C_6$alkyl radical which is unsubstituted or substituted by —OH, phenoxy, $C_1$-$C_4$alkoxy or hydroxyalkoxy, or R$^7$ may be a $C_5$-$C_8$cycloalkyl radical, preferably a cyclopentyl or cyclohexyl radical.

Preferably, the radical R$^3$ is hydrogen, —CN or —CONR$^5$R$^6$, in which R$^5$ and R$^6$ are each independently of the other as defined above; particularly preferred meanings of R$^3$ are hydrogen and —CN.

The bridge member X may be e.g. an alkylene, alkenylene, alkylidene, cycloalkylene or cycloalkylidene radical or a radical of the formula —CH$_2$—X'—CH$_2$—, in which X' is a bivalent radical of an an unsubstituted or substituted aromatic hydrocarbon or heteroaromatic compound.

X as alkylene may be e.g. methylene, 1,2-ethylene, 1,3-propylene, 1,4-butylene, 1-methyl-1,4-butylene, 2- methyl-1,4-butylene, 1,5-pentylene or 1,6-hexylene. X as alkylene is preferably straight chain $C_2$-$C_4$alkylene.

X as alkenylene may be e.g. a butenylene radical.

X as alkylidene is preferably $C_2$-$C_6$alkylidene; e.g. 1,1-ethylidene, 1,1-propylidene, 1,1-butylidene, 1,1-pentylidene or 1,1-hexylidene.

X as cycloalkylene or cycloalkylidene is e.g. 1,2-, 1,3- or 1,4-cyclohexylene, 1,2- or 1,3-cyclopentylene, 1,1-cyclohexylidene or 1,1-cyclopentylidene.

If X is a radical of the formula $-CH_2-X'-CH_2-$, then X' is e.g. a bivalent radical of an unsubstituted or substituted $C_6$-$C_{18}$aromatic compound or $C_4$-$C_{14}$heteroaromatic compound.

X' as a bivalent radical of a $C_6$-$C_{18}$aromatic compound may be a radical of a mononuclear fused, polynuclear fused or polynuclear unfused aromatic compound. Examples of such radicals are a bivalent radical of the benzene or naphthalene series or a bivalent anthracene, biphenyl or terphenyl radical.

The two methylene groups at the aromatic hydrocarbon radical X' may be bonded in virtually all positions, with those positions being preferred which lead to elongated dye molecules of formula I. Thus, for example, X' as a bivalent radical of the benzene series is preferably 1,4-phenylene, X' as a bivalent biphenyl radical is preferably 4,4'-biphenylene and X' as a bivalent terphenyl radical is preferably 4,4''-terphenylene.

The bivalent radical of an aromatic $C_6$-$C_{18}$hydrocarbon may be substituted by one or more identical or different substituents, e.g. by substituents selected from the group consisting of $C_1$-$C_4$alkyl, $C_1$-$C_4$alkoxy and halogen. X' as a bivalent radical of a $C_6$-$C_{18}$aromatic compound is preferably unsubstituted.

X' as a radical of a $C_4$-$C_{14}$heteroaromatic compound may be e.g. a bivalent pyrrole, furan, oxazole, thiophene, imidazole, pyridine, quinoline, benzimidazole, carbazole or xanthene radical.

The bivalent heteroaromatic radical preferably contains 1 to 3, most preferably 1 or 2, hetero atoms such as O, S and N. A particularly preferred bivalent heteromatic radical is a 5- or 6-membered ring.

The bivalent heteroaromatic radical may be substituted by one or more identical or different substituents, e.g. by substituents selected from the group consisting of $C_1$-$C_4$alkyl, $C_1$-$C_4$alkoxy and halogen. X' as a bivalent radical of a $C_4$-$C_{14}$heteroaromatic compound is preferably unsubstituted.

In preferred vat dyes of formula I, X is a $-CH_2-X'-CH_2$ group, with a particularly preferred meaning of X' being a bivalent radical of an unsubstituted or substituted $C_6$-$C_{18}$aromatic compound.

Particularly preferred vat dyes of formula I are those wherein X is $-CH_2-X'-CH_2-$ and X' is an unsubstituted or substituted phenylene, biphenylene or naphthylene radical.

In a more particularly preferred embodiment of the vat dyes of the invention, X is a $-CH_2-X'-CH_2-$ group and X' is 1,4-phenylene or 4,4'-biphenylene.

The radical (a) of the benzene series may be substituted by one or more identical or different substituents. Examples of possible substituents are halogen such as fluorine, chlorine or bromine, $-OH$, $C_1$-$C_4$alkoxy, phenoxy which is unsubstituted or substituted e.g. by $C_1$-$C_4$alkyl or halogen, or $-NO_2$, $-NH_2$, N-mono- or N,N-di($C_1$-$C_4$)alkylamino or NH-phenyl, the phenyl moiety of which is unsubstituted or substituted by $C_1$-$C_4$alkyl, $C_1$-$C_4$alkoxy or halogen.

In preferred vat dyes of formula I, the radical (a) of the benzene series is unsubstituted.

In each of formulae I, III and IV and the Examples only one of the various conceivable basic structures for the tetrazoles is indicated; further basic structures are known to the skilled person and are comprised by the formulae.

In the compounds of formula I, various positions of each respective tetrazole are suitable for the bonding of the organic bridge member X to said tetrazoles, i.e. the 1- or 2-position of the one heterocycle and the 1'- or 2'-position of the other.

Preferred compounds of formula I are those wherein X is bonded in the 2-position of the one tetrazole heterocycle and in the 2'-position of the other.

Moreover, the invention also relates to mixtures of all conceivable isomeric compounds of formula I in which the position of X at one or both tetrazole groups may differ.

A preferred embodiment of the invention relates to vat dyes of formula I wherein $R^1$ and $R^2$ are each independently of the other $-NHR^4$ or $-OR^5$ and $R^4$ and $R^5$ are as defined above, $R^3$ is hydrogen or $-CN$, X is a radical of the formula $-CH_2-X'-CH_2-$ and X' is a bivalent radical of an unsubstituted or substituted $C_6$-$C_{18}$aromatic compound or a bivalent radical of a $C_4$-$C_{14}$heteroaromatic compound and the radical (a) of the benzene series is unsubstituted.

In a particularly preferred embodiment of the vat dyes of formula I, the radicals [A] and [A'] are identical.

More particularly preferred vat dyes of formula I are those wherein [A] and [A'] are identical, $R^1$ and $R^2$ are each independently of the other the $-NHR^4$ group, $R^3$ is hydrogen or $-CN$, $R^4$ is hydrogen, $C_1$-$C_4$alkyl or $C_5$-$C_6$cycloalkyl, or is phenyl which is unsubstituted or substituted by one or more substituents selected from the group consisting of $C_1$-$C_4$alkyl, $C_1$-$C_4$alkoxy and halogen, X is a bridge member of the formula $-CH_2-X'-CH_2-$, X' is a bivalent radical of a $C_6$-$C_{18}$aromatic compound, preferably 1,4-phenylene or 4,4'-biphenylene, and the radical (a) of the benzene series is unsubstituted.

The vat dyes of formula I can be prepared by methods which are known per se, e.g. by reacting tetrazole compounds of the formulae $$[A]\begin{array}{c}N=\!\!=\!\!N\\ \diagdown\diagup\!\!\!\!\!\!{\phantom{|}}_{N\ominus M\oplus}\\ N\end{array} \quad (III)$$

and $$[A']\begin{array}{c}N=\!\!=\!\!N\\ \diagdown\diagup\!\!\!\!\!\!{\phantom{|}}_{N\ominus M\oplus}\\ N\end{array} \quad (IV)$$

in which formulae [A] and [A'] are as defined above and may be identical or different and $M\oplus$ is $Li\oplus$, $Na\oplus$, $K\oplus$ or $NH_4\oplus$, with a dihalogen compound of the formula $$Hal^1-X-Hal^2 \quad (V)$$

wherein X is as defined in claim 1 and $Hal^1$ and $Hal^2$ are each independently of the other halogen such as chlorine, bromine or iodine.

In this preparatory process the compounds of formulae III and IV may be reacted simultaneously or, in any sequence, in succession with the dihalogen compound.

If [A] and [A'] are different anthraquinone radicals, the compounds of formulae III and IV are preferably reacted in succession with the dihalogen compound.

If [A] and [A'] are identical, then it is preferred to react 2 mole equivalents of the compound of the formula

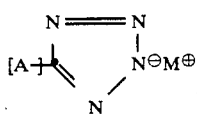 (III)

with 1 mole equivalent of the dihalogen compound of the formula

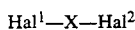 (V)

in which formulae [A], X, M⊕, Hal¹ and Hal² are as defined above.

Hal¹ and Hal² may be identical or different and are each independently of the other preferably chlorine or bromine, most preferably chlorine.

If [A] and [A'] are identical anthraquinone derivatives, then Hal¹ and Hal² are preferably identical.

The anthraquinone derivatives of formulae III and IV are known or they can be prepared by known methods, e.g. in the manner disclosed in published European patent application 79 862.

The reaction of the anthraquinone derivatives of formulae III and IV with the dihalogen compound is preferably carried out in the presence of a solvent, most preferably in the presence of a polar aprotic solvent. Examples of suitable solvents are: nitrogen-containing compounds such as formamide, dimethylformamide, dimethylacetamide, N,N,N',N'-tetramethylurea, N-methylpyrrolidone, 1,5-dimethylpyrrolidone and pyridine; sulfur-containing compounds such as sulfolane (tetramethylenesulfone) and sulfolene (2,3- and 2,5-dihydrothiophene-S-dioxide) and the derivatives thereof which are substituted in the α- and/or β-positions in particular by alkyl or hydroxyalkyl groups, and dimethyl sulfoxide; and also phosphorus-containing compounds such as hexamethylphosphoric triamide and bis(dimethylamido)methanephosphate.

The preferred solvent is dimethylformamide.

In general, the reaction is carried out in the temperature range from 70° to 150° C., preferably from 100° to 150° C.

The compounds of formula I are isolated and purified in a manner known per se, e.g. by suction filtration and/or washing with water or other suitable solvents.

Vat dyes of formula I wherein [A] and [A'] are identical can preferably be obtained by a process carried out continuously in a single reaction vessel, namely by first reacting an anthraquinone derivative of the formula

 (VI)

with an azide in a polar aprotic solvent, in the absence or presence of an ammonium salt, to give the tetrazole compound of the formula

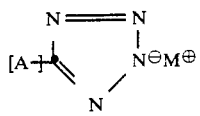 (III)

and subsequently, without intermediary isolation, reacting said tetrazole compound with a compound of the formula

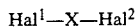 (V)

in which formulae Hal¹ and Hal² are each independently of the other halogen such as chlorine, bromine or iodine and [A], M⊕ and X are each as defined above.

The compounds of formulae VI are known or they can be prepared by known methods, e.g. in the manner disclosed in published European patent application 79 862.

Examples of azides employed are ammonium azide or, preferably, alkali metal azides such as potassium azide and, most preferably, sodium azide.

Suitable polar aprotic solvents are e.g. those solvents indicated above, with dimethylformamide being preferred.

The ammonium salt may be e.g. ammonium sulfate, ammonium carbonate, ammonium bicarbonate or, preferably, ammonium chloride. The reaction is preferably carried out without an ammonium salt.

The first reaction step is generally carried out at a temperature in the range from 70° to 150° C., preferably from 100° to 150° C., and yields the tetrazole compound of formula III which, without intermediary isolation, is reacted in the manner described above with the dihalogen compound of the formula Hal¹—X—Hal², in which Hal¹ and Hal² are preferably identical.

The novel vat dyes of the present invention are suitable for dyeing or printing a wide range of materials, in particular fibres made of natural or regenerated cellulose, in the presence of a reducing agent, e.g. dithionite.

The dyes have a very good build-up. The resultant dyeings are distinguished by good levelness and a clear shade. The fastness properties are generally very good, in particular the fastness to light, water, chlorine and soda boiling.

The novel dyes reserve polyester fibres well or stain them tone-in-tone. Therefore, in admixture with disperse dyes they are suitable for dyeing blended fibres made of cellulose and polyester material.

The invention further relates to the use of the vat dyes of formula I for dyeing or printing textile materials, in particular those made of cellulose material.

The dyes of the present invention may also be used as pigments for a wide variety of pigment applications, e.g. in finely particulate form for the dyeing of rayon and viscose or of cellulose ethers or esters or of superpolyamides, superpolyurethanes or polyesters in the spinning mass, and also for the preparation of dyed varnishes or varnish formers, solutions or products of acetylcellulose, nitrocellulose, natural resins or artificial resins such as polymerisation resins or condensation resins, e.g. aminoplasts, alkyd resins, phenoplasts, polyolefins such as polystyrene, polyvinyl chloride, polyethylene, polypropylene, polyacrylonitrile, rubber, casein, silicone and silicone resins. Furthermore, the dyes of this invention can advantageously be employed for the manufacture of crayons, cosmetic preparations or laminating plates.

In the following Examples parts and percentages are by weight.

EXAMPLE 1

29 parts of 1,4-diamino-2,3-dicyananthraquinone and 7.2 parts of sodium azide are stirred for 5 hours at 140° C. in 300 parts of dimethylformamide. After the addition of 9 parts of 1,4-dichloromethylbenzene, the reaction mixture is stirred further for 15 hours at 120° C. The precipitated reaction product of the formula is isolated by suction filtration, washed with water and dried. The dye is suitable for dyeing cellulose material. Blue dyeings with good fastness properties and high colour yields are obtained.

EXAMPLES 2 TO 14

Following the procedure as described in Example 1, but using instead of 1,4-diamino-2,3-dicyanathraquinone the anthraquinone derivatives listed in Table 1 under A and instead of 1,4-dichloromethylbenzene the dihalogen compounds listed in Table 1 under B, there are obtained dyes which dye cellulose in blue to bluish green shades

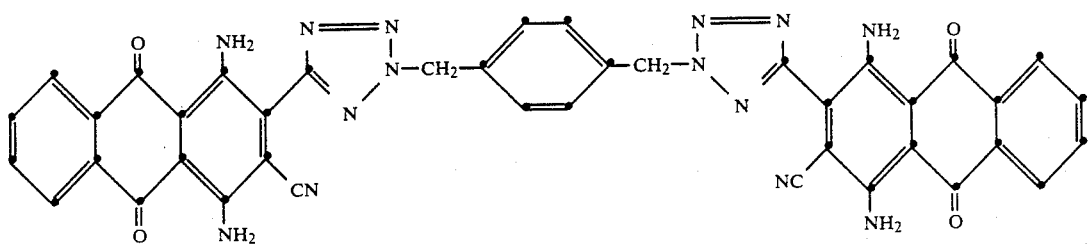

with good fastness properties.

TABLE 1

| Ex. | A | B |
|-----|---|---|
| 2 | 1,4-diamino-2,3-dicyanoanthraquinone | Cl—CH₂—(biphenyl)—CH₂—Cl |
| 3 | 1-amino-2-cyano-4-phenylamino-anthraquinone | Cl—CH₂—(biphenyl)—CH₂—Cl |
| 4 | 1-amino-2-cyano-4-phenylamino-anthraquinone | Cl—CH₂—(phenyl)—CH₂—Cl |
| 5 | 1-amino-2-cyano-4-(4-methylphenylamino)-anthraquinone | Cl—CH₂—(phenyl)—CH₂—Cl |

TABLE 1-continued
| Ex. | A | B |
|---|---|---|
| 6 | 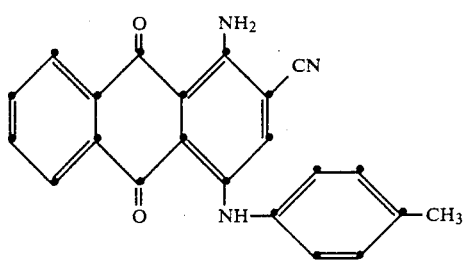 | 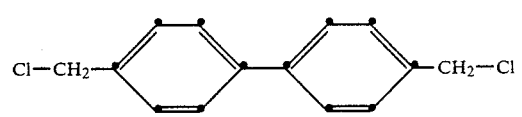 |
| 7 | 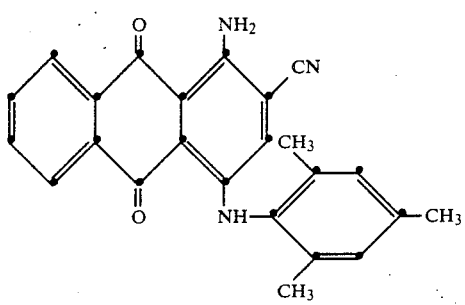 | 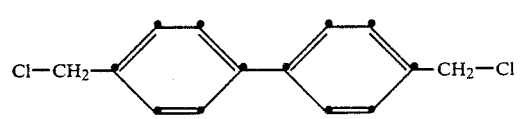 |
| 8 | 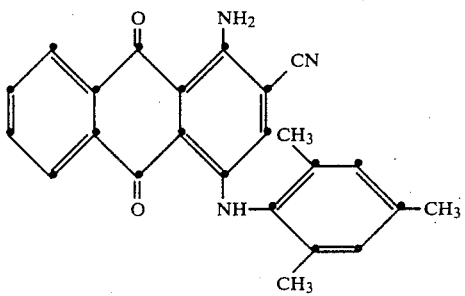 | 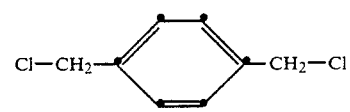 |
| 9 | 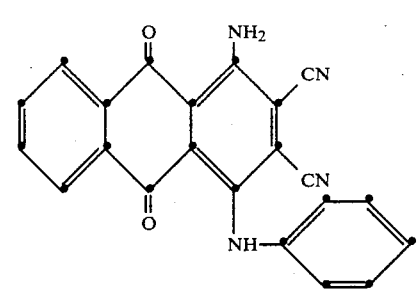 | 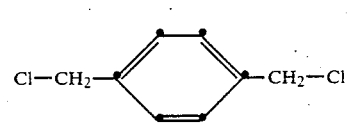 |
| 10 | 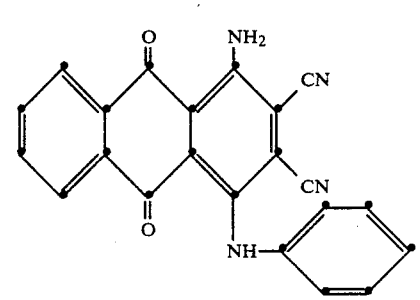 | 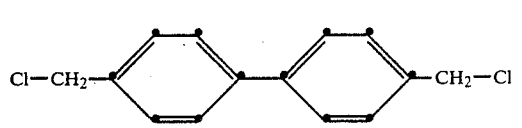 |

TABLE 1-continued

| Ex. | A | B |
|---|---|---|
| 11 | 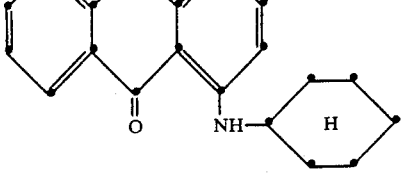 | 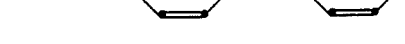 |
| 12 | 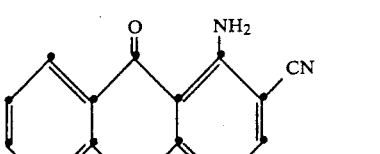 |  |
| 13 | 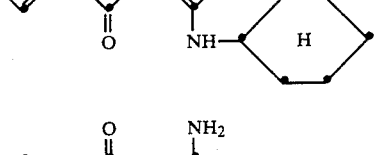 |  |
| 14 | 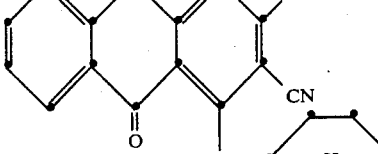 | 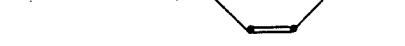 |

EXAMPLE 15

1 part of the dye obtained according to Example 1 is stirred with 10 parts by volume of 30% aqueous sodium hydroxide solution and 5 parts of sodium hydrosulfite in 200 parts of water at a temperature in the range from 50° to 70° C. This stock vat is added to a dye bath containing 5 parts by volume of 30% aqueous sodium hydroxide solution and 3.7 parts of sodium hydrosulfite in 2000 parts of water, and 100 parts of cotton are then introduced at 40° C. 15 parts of sodium chloride are added after 10 minutes, followed by the addition of a further 15 parts after 20 minutes. The cotton is then dyed at 40° C. for 45 minutes. Subsequently, the cotton is squeezed out, oxidised and finished in a conventional manner. A clear blue dyeing with good fastness properties is obtained on the cotton.

EXAMPLE 16

5 parts of the dye obtained according to Example 1 are mixed with 95 parts of dioctyl phthalate, and the resultant mixture is ground in a ball mill until the dye particles are smaller than 3μ.

0.8 part of this dioctyl phthalate paste are mixed with 13 parts of polyvinyl chloride, 7 parts of dioctyl phthalate and 0.1 part of cadmium stearate, and the resultant mixture is subsequently rolled out for 5 minutes at 140° C. in a two-roll mill. A blue dyeing with good migration properties and good lightfastness is obtained on the material.

EXAMPLE 17

10 g of titanium dioxide and 2 g of the dye obtained according to Example 10 are ground with a mixture of 26.4 g of coconut alkyd resin, 24.0 g of melamine-formaldehyde resin (50% solid content), 8.8 g of ethylene glycol monomethyl ether and 28.8 g of xylene for 48 hours in a ball mill.

If the resultant varnish is sprayed onto an aluminium sheet, predried for 30 minutes at room temperature and then baked for 30 minutes at 120° C., a greenish blue finish is obtained which, while having a good colour

What is claimed is:

1. A vat dye of the formula

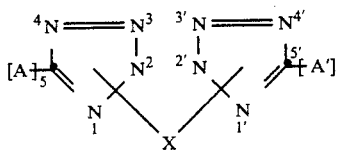

wherein

[A] and [A'] are each independently of the other an antrhraquinone radical of the formula

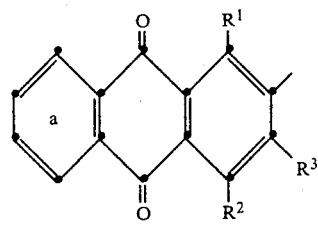

$R^1$ and $R^2$ are each independently of the other $-NHR^4$ or $-OR^5$, $R^3$ is hydrogen, $-CN$, halogen, $-CONR^5R^6$, $-SO_2NR^5R^6$ or $-COOR^7$, $R^4$ is hydrogen, unsubstituted or substituted $C_1-C_6$alkyl, unsubstituted or substituted $C_5-C_8$cycloalkyl, unsubstituted or substituted aryl, or $-COR^8$, $R^5$ and $R^6$ are each independently of the other hydrogen, unsubstituted or substituted $C_1-C_6$alkyl or unsubstituted or substituted phenyl, $R^7$ is unsubstituted or substituted $C_1-C_6$alkyl, or $C_5-C_8$cycloalkyl, $R^8$ is unsubstituted or substituted $C_1-C_6$alkyl or unsubstituted or substituted phenyl, X is an organic bridge member of the formula $-CH_2-X'-CH_2-$ and X' is a bivalent radical of an unsubstituted or substituted $C_6-C_{18}$ aromatic compound or $C_4-C_{14}$heteroaromatic compound, and the radical (a) of the benzene series is unsubstituted or substituted.

2. A vat dye according to claim 1, wherein X' is an unsubstituted or substituted bivalent radical of the benzene or naphthalene series or an unsubstituted or substituted bivalent anthracene, biphenyl, terphenyl, pyrrole, furan, thiophene, oxazole, imidazole, pyridine, quinoline, benzimidazole, carbazole or xanthene radical.

3. A vat dye according to claim 1, wherein X' is an unsubstituted or substituted bivalent radical of a $C_6-C_{18}$aromatic compound.

4. A vat dye according to claim 1, wherein X' is an unsubstituted or substituted phenylene, biphenylene or naphthylene radical.

5. A vat dye according to claim 1, wherein X' is unsubstituted or substituted by one or more substituents selected from the group consisting of $C_1-C_4$alkyl, $C_1-C_4$alkoxy and halogen.

6. A vat dye according to claim 1, wherein X' is an unsubstituted 1,4-phenylene or 4,4'-biphenylene radical.

7. A vat dye according to claim 1, wherein the bridge member X is bonded in the 2-position of the one tetrazole heterocycle and in the 2'-position of the other.

8. A vat dye according to claim 1, wherein the radicals $R^1$ and $R^2$ are each independently of the other $-NHR^4$ and $R^4$ is hydrogen, $C_1-C_4$alkyl or $C_5-C_6$cycloalkyl, or is phenyl which is unsubstituted or substituted by one or more substituents selected from the group consisting of $C_1-C_4$alkyl, $C_1-C_4$alkoxy and halogen.

9. A vat dye according to claim 1, wherein $R^3$ is hydrogen, $-CN$ or $-CONR^5R^6$ and $R^5$ and $R^6$ are as defined in claim 1.

10. A vat dye according to claim 1, wherein $R^3$ is hydrogen or $-CN$.

11. A vat dye according to claim 1, wherein the radical (a) of the benzene series is unsubstituted.

12. A vat dye according to claim 1, wherein [A] and [A'] are identical.

13. A vat dye according to claim 1, wherein $R^1$ and $R^2$ are each independently of the other $-NHR^4$ or $-OR^5$ and $R^4$ and $R^5$ are as defined in claim 1, $R^3$ is hydrogen or $-CN$, X is a radical of the formula $-CH_2-X'-CH_2-$ and X' is a bivalent radical of an unsubstituted or substituted $C_6-C_{18}$ aromatic compound or $C_4-C_{14}$heteroaromatic compound and the radical (a) of the benzene series is unsubstituted.

14. A vat dye according to claim 1, wherein [A] and [A'] are identical, $R^1$ and $R^2$ are each independently of the other the $-NHR^4$ group, $R^3$ is hydrogen or $-CN$, $R^4$ is hydrogen, $C_1-C_4$alkyl or $C_5-C_6$cycloalkyl, or is phenyl which is unsubstituted or substituted by one or more substituents selected from the group consisting of $C_1-C_4$alkyl, $C_1-C_4$alkoxy and halogen, X is a bridge member of the formula $-CH_2-X'-CH_2-$, X' is a bivalent radical of a $C_6-C_{18}$aromatic compound and the radical (a) of the benzene series is unsubstituted.

15. A vat dye according to claim 14, wherein X' is a 1,4-phenylene or 4,4'-biphenylene radical.

* * * * *